United States Patent [19]

Jackson

[11] Patent Number: 6,087,833
[45] Date of Patent: *Jul. 11, 2000

[54] PASSIVE GEOPHYSICAL PROSPECTING APPARATUS AND METHOD BASED UPON DETECTION OF DISCONTINUITIES ASSOCIATED WITH EXTREMELY LOW FREQUENCY ELECTROMAGNETIC FIELDS

[75] Inventor: John R. Jackson, 7987 S. Saulsbury St., Littleton, Colo. 80128

[73] Assignees: John R. Jackson; Andreas M. Arismendi, Jr., both of Houston, Tex.

[*] Notice: This patent is subject to a terminal disclaimer.

[21] Appl. No.: 09/109,853

[22] Filed: Jul. 2, 1998

Related U.S. Application Data

[63] Continuation of application No. 08/703,485, Aug. 27, 1996, Pat. No. 5,777,478.

[51] Int. Cl.$^7$ ............................. G01V 3/12; G01V 3/40

[52] U.S. Cl. ........................................... 324/348; 324/344

[58] Field of Search ..................... 324/324, 330, 324/331, 344, 345, 346, 347, 348, 349, 350, 351

[56] References Cited

U.S. PATENT DOCUMENTS

| | | | |
|---|---|---|---|
| 2,246,542 | 6/1941 | Smith | 164/0.5 |
| 2,608,602 | 8/1952 | Muffly | 175/182 |
| 2,623,923 | 12/1952 | Zimmerman | 175/182 |

(List continued on next page.)

OTHER PUBLICATIONS

"Geophysical Exploration by Telluric Currents, with Special Reference to a Survey of the Haynesville Salt Dome, Wood County, Texas", Eric Boissonnas and Eugene G. Leonardon, *Geophysics*, Jul. 1148, pp. 387–403.

*The Art of Electronics*, Second Edition, Horowitz and Hill, Cambridge University Press 1980, 1989, pp. 641–655, 889, and 895–901.

*Electronics Engineers' Handbook*, First Edition, Fink and McKenzie, McGraw–Hill Book Company, 1975 pp. 19–23, through 19–25; pp. 22–62 through 22–64.

Proceedings of the IEEE, vol. 67, No. 7, Jul. 1979, "The Fundamental Model of Magnetotelluric Sounding", Dmitriev and Berdichevsky.

*Geophysics*, vol. 50, No. 4 (Apr. 1985), pp. 656–664, "Geophysical exploration with audiofrequency natural magnetic fields", Labson, Beker, Morrison, Conti.

Radio Shack Dictionary, ©1972, by Howard W. Sams & Co., Inc. Indianapolis, Indiana, pp. 364, 374, 448.

*Primary Examiner*—Walter E. Snow
*Attorney, Agent, or Firm*—A. M. (Andy) Arismendi, Jr.

[57] ABSTRACT

An apparatus and method for passively determining the depth and thickness of a subterranean geologic formation bearing hydrocarbons, e.g., oil and/or gas, or commercially important ore deposits, e.g., precious metals. The apparatus has an antenna to pick up extremely low frequency signals naturally emanating from the Earth's surface. In a preferred embodiment, the received signal is amplified and filtered. The signal is then modulated onto a carrier wave. The modulated signal is then filtered to eliminate one of the sidebands, for example, the lower sideband. An oscillator generates a tuning frequency which is then beat against the filtered, modulated signal in order to tune to a particular frequency. The oscillator sweeps through the range of frequencies, e.g., in the upper sideband portion of the filtered, modulated signal. For each desired frequency within this range which corresponds to a certain depth in the Earth, the tuned signal is adjusted to the desired frequency and is sent to a voltage level detector for detecting the tuned information and converting same to pulses. The pulses are counted over a desired time period to determine the pulse density, i.e., number of pulses per unit of time. A counter may be used and set as a trigger to send an output signal when a specific number of pulses per unit time is achieved. The pulses or output signal may be displayed, recorded and/or sent to a computer and later manipulated by varying the specified unit of time, i.e., the time span, to examine the pulse density information.

6 Claims, 10 Drawing Sheets

U.S. PATENT DOCUMENTS

| | | | |
|---|---|---|---|
| 3,087,111 | 4/1963 | Lehan et al. | 324/1 |
| 3,136,943 | 6/1964 | Slichter | 324/7 |
| 3,197,704 | 7/1965 | Simon et al. | 325/438 |
| 3,361,957 | 1/1968 | Hings | 324/1 |
| 3,510,766 | 5/1970 | Russell et al. | 324/72.5 |
| 3,662,260 | 5/1972 | Thomas et al. | 324/72 |
| 3,679,978 | 7/1972 | Hopkins, Jr. | 325/187 |
| 3,700,933 | 10/1972 | Harkenrider et al. | 307/310 |
| 3,942,101 | 3/1976 | Sayer et al. | 324/1 |
| 3,986,207 | 10/1976 | Gerbel et al. | 360/6 |
| 4,198,596 | 4/1980 | Waeselynck et al. | 324/344 |
| 4,409,551 | 10/1983 | Norton | 324/349 |
| 4,434,508 | 2/1984 | Sommer | 455/306 |
| 4,507,611 | 3/1985 | Helms | 324/323 |
| 4,584,530 | 4/1986 | Nicholson | 324/425 |
| 4,658,215 | 4/1987 | Vinegar et al. | 324/366 |
| 4,686,475 | 8/1987 | Kober et al. | 324/349 |
| 4,724,390 | 2/1988 | Rauscher et al. | 324/344 |
| 4,825,165 | 4/1989 | Helms et al. | 324/323 |
| 4,841,250 | 6/1989 | Jackson | 324/349 |
| 4,945,310 | 7/1990 | Jackson | 324/349 |
| 5,148,110 | 9/1992 | Helms | 324/323 |
| 5,777,478 | 7/1998 | Jackson | 324/344 |

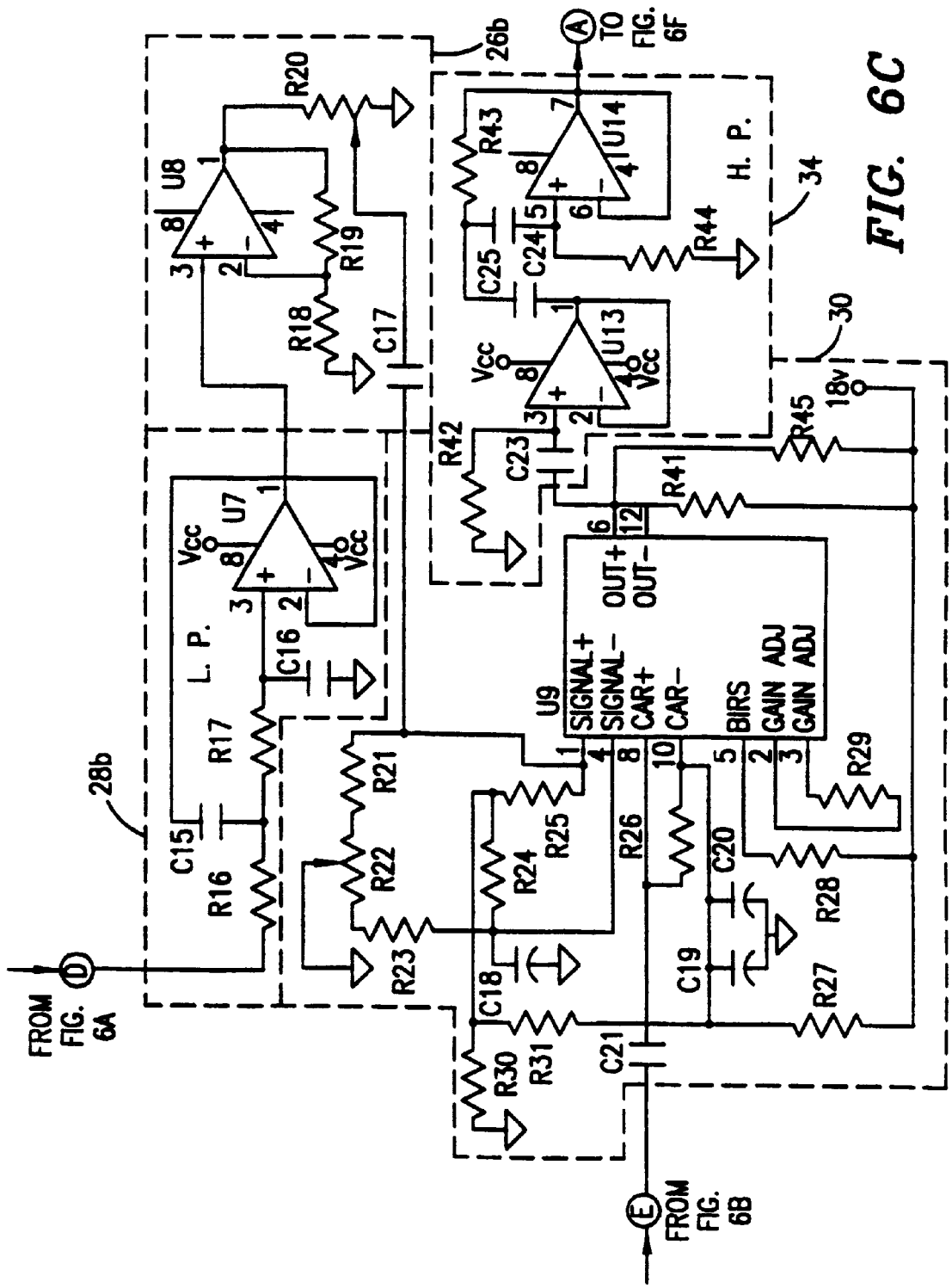

PASSIVE GEOPHYSICAL PROSPECTING APPARATUS AND METHOD BASED UPON DETECTION OF DISCONTINUITIES ASSOCIATED WITH EXTREMELY LOW FREQUENCY ELECTROMAGNETIC FIELDS

RELATED APPLICATIONS

This is a continuation of U.S. patent application Ser. No. 08/703,485, filed Aug. 27, 1996, issued Jul. 7, 1998 as U.S. Pat. No. 5,777,478.

BACKGROUND OF THE INVENTION

1. Field of the Invention

The present invention relates to an apparatus and method for passive geophysical prospecting. More particularly, the present invention relates to detecting at the Earth's surface in a non-invasive manner subsurface discontinuities associated with extremely low frequency electromagnetic fields.

2. Description of Related Art

The art is replete with various passive methods and associated apparatusfor passive geophysical prospecting. There is great motivation in discovering a reliable method of this type which is simple and therefore relatively inexpensive when compared to actually drilling or performing non-passive geophysical prospecting, e.g., seismic measurements and the associated and expensive computer manipulation of resulting data, in a known area having discontinuous strata or in an unknown area, i.e., wildcat territory, or to determine if zones of a producing formation were missed or just beyond the terminus of an existing well.

Several passive methods utilize an antenna to pick up naturally occurring frequencies emanating from the Earth's surface. Typically, the received signal is amplified, filtered and detected. See for example U.S. Pat. No. 5,148,110 to Helms which detects a time varying signal emanating from the Earth's surface. U.S. Pat. No. 4,686,475 to Kober et al. detects the vertical electric field component of telluric currents using a special antenna and a tunable RC filter with detection be performed in an audio manner using the ears of an operator. This method is subjective to the operator and therefore suffers in reliability and consistency.

There is much noise associated with or interfering with these low frequency signals.

This one reason why low pass and high pass filtering is employed after the initial amplification of the signal. However, because of the initial low frequencies of the signal, it is difficult to discern the valuable information it carries and conditioning is preferred. Those skilled in the art have been trying for a long time without great success to find the proper way of conditioning the received signal to discern this valuable information in a consistent and reliable manner. It is for this reason that such passive techniques have not been accepted by the hydrocarbon prospecting community and relegated to the level of "divining rods".

One problem is that simple amplification is typically not sufficient to allow the filters to operate effectively. For this reason a frequency generated by an oscillator has been added to the signal in certain methods using a mixer to add amplitude and furnish a reference frequency for filtering the received signal. See for example, U.S. Pat. No. 3,087,111 to Lehan et al.(amplifies signal and then adds the oscillator frequency), U.S. Pat. No. 3,197,704 to Simon et al. and U.S. Pat. No. 4,198,596 to Waeselynck et al. (amplifies, filters, adds oscillator frequency and then low pass filters). For the most part, the oscillator controls the center pass frequency of the filters being used. However, the quality of the received signal is not enhanced and the problems of reliability and consistency remain.

SUMMARY OF THE INVENTION

The present invention provides a surprisingly reliable and consistent method and apparatus for passive geophysical prospecting utilizing the low frequency signals emanating from the Earth's surface. As a result of extensive experimental testing, greater than seventy percent (70%) success rate has been experienced and reproducibility of results at a given location achieved. This is particularly true in determining the absence of hydrocarbons or precious metals in subsurface formations, which is quite valuable in unproven, virgin areas. The apparatus and method are simple and relatively inexpensive and expeditious time-wise when compared to methods currently being used commercially. The method and apparatus may be used alone for hydrocarbon or precious metal prospecting or in conjunction with currently available prospecting techniques to verify same or to identify promising and/or unpromising areas prior to expending the effort and money to perform the more traditional, time and labor intensive, and expensive prospecting techniques.

Accordingly, there is provided an apparatus and method for passively determining the depth and thickness of a subterranean geologic formation bearing hydrocarbons, e.g., oil and/or gas, or commercially important ores, e.g., precious metals. In one embodiment of the invention, the apparatus has an antenna to pick up an extremely low frequency signal emanating from the Earth's surface. This signal is believed to be associated with the Earth's electromagnetic fields. Each frequency of this signal corresponds to a certain depth in the Earth and carries information regarding the presence of such subterranean geologic formations. Unlike the prior art, the novel apparatus of the present invention has a product detector which receives the signal picked up by the antenna and multiplies it with a frequency generated by an oscillator. The oscillator is capable of sweeping though the frequencies corresponding to the depths of interest. By "beating" the frequency of the corresponding depth against the received signal, a tuned signal is generated for each tuning frequency by the product detector and contains the information corresponding to that depth. The tuned signal may then be sent to a display, recorder or to a computer for later processing and evaluation.

In order to enhance the reliability and reproducibility of the apparatus according to the present invention, the apparatus preferably has a voltage detector. The voltage detector receives the tuned signal from the product detector, detects the tuned information carried by the tuned signal and converts the tuned information to pulses. The pulses are outputted by the voltage detector. The pulses or output signal may be recorded digitally on tape or in analog fashion on a strip recorder and/or sent to a computer for display on a CRT and later manipulated using methods and techniques that are well known in the art. The pulses are counted over a desired tine period to determine the pulse density, i.e., number of pulses per unit of time. It is noted that the function of the level detector may be performed by a computer acting on the tuned signal received by it in real-time or after the fact by manipulating stored tuned signal information and generating data equivalent in information content to the pulses generated by the voltage level detector. In either manner, the pulse density may be determined from the pulse data using the computer. Further, the pulse data may be manipulated using the computer, e.g., by varying the specified unit of time, i.e., the time span, to examine the pulse density information.

Alternatively, with the voltage detector in place, the apparatus may further comprise a counter which may be set to trigger an output signal when a specific number of pulses per unit time is achieved. The trigger point may be varied, thereby varying the specified unit of time, i.e., the time span, to examine the pulse density information.

In view of the low frequencies and low signal strength of the signals emanating from the Earth's surface, the received signal is preferably conditioned to increase its frequency and signal strength to enhance detection of the tuned signal information. Thus, in a preferred embodiment, the received signal is amplified and filtered. The signal is then modulated onto a carrier wave. The modulated signal is then filtered to eliminate one of the sidebands, for example, the lower sideband. In this case, the oscillator generates a tuning frequency which is then beat against the filtered, modulated signal in order to tune to a particular frequency. The oscillator sweeps through the range of frequencies in the remaining sideband portion, e.g., the upper sideband portion, of the filtered, modulated signal. For each desired frequency in this range, a tuned signal is generated corresponding to the desired frequency and therefore a certain depth in the Earth. As before noted in the previous embodiment, the apparatus preferably has a voltage detector. The voltage detector receives the tuned signal from the product detector, detects the tuned information carried by the tuned signal and converts the tuned information to pulses. The pulses are outputted by the voltage detector. The pulses or output signal may be recorded digitally on tape or in analog fashion on a strip recorder and/or sent to a computer for display on a CRT and later manipulated. The pulses are counted over a desired time period to determine the pulse density, i.e., number of pulses per unit of time. As noted above, the function of the level detector may be preformed by a computer acting on the tuned signal received by it in real-time or after the fact by manipulating stored tuned signal information and generating data equivalent in information content to the pulses generated by the voltage level detector. In either manner, the pulse density may be determined from the pulse data using the computer. Further, the pulse data may be manipulated using the computer, e.g., by varying the specified unit of time, i.e., the time span, to examine the pulse density information. Alternatively, with the voltage detector in place, the apparatus may further comprise a counter which may be set to trigger an output signal when a specific number of pulses per unit time is achieved. The trigger point may be varied, thereby varying the specified unit of time, i.e., the time span, to examine the pulse density information.

According to another embodiment of the present invention, a method for passive geophysical prospecting is provided which comprises:

receiving a signal emanating from the Earth's surface with an antenna;

generating a received signal corresponding to the signal emanating from the Earth's surface;

generating a tuning frequency;

sweeping the tuning frequency at least through the range of frequencies contained in the received signal;

multiplying the received signal and the tuning frequency to generate a product signal;

synchronously tuning the product signal over the range of frequencies contained in the received signal; and generating a tuned signal containing tuned information.

In order to enhance the reliability and reproducibility of the method of the present invention, the method preferably further comprises:

converting the tuned information to pulse information representative thereof. The pulse information may be manipulated using software in a computer or hardware to determine pulse density. The pulse information may be generated by comparing individual pieces of information to a reference point, which may also be adjusted to effect changes in the pulse density for evaluation purposes. The greater the pulse density; the greater the likelihood of a positive indication of the presence of, e.g., the desired hydrocarbon or precious metal.

In view of the low frequencies and signal strength of the signal emanating from the Earth's surface, the received signal is preferably conditioned. Accordingly, a method for passive geophysical prospecting is provided, wherein the method comprises:

receiving a signal emanating from the Earth's surface with an antenna;

generating a received signal corresponding to the signal emanating from the Earth's surface;

amplifying the received signal to generate an amplified signal;

generating a carrier wave using an oscillator;

modulating the carrier wave with the amplified signal generating a modulated signal having the carrier wave, an upper sideband and a lower sideband, wherein the modulation may be either amplitude or frequency modulation;

preferably canceling the carrier wave from the modulated signal generating an output signal having the upper and lower sidebands; and eliminating one of the sidebands using a filter, preferably eliminating the lower sideband using a high pass filter which passes the high sideband but not the lower sideband.

The method preferably further comprises:

generating a tuning frequency;

sweeping the tuning frequency at least through the range of frequencies contained in the filtered, modulated signal;

multiplying the filtered, modulated signal and the tuning frequency to generate a product signal;

synchronously tuning the product signal at least over the range of frequencies contained in the filtered, modulated signal; and generating a tuned signal for each tuning frequency, each of the tuned signals having tuned information.

The tuning frequency is preferably generated using an oscillator which preferably can increment (or decrement as desired) the tuning frequency in increments ranging from 0.01 to 10 Hz. The sweeping rate preferably ranges from 1 Hz per second to 200 Hz per second. Therefore, the method provides a record which relates time to the frequency tuned and accordingly to the depth of the corresponding tuned information, typically in the form of a field discontinuity or transient occurrence, which is indicative of the presence of a hydrocarbon(s) or precious metals at that depth.

The product signal contains the tuned information relating to field discontinuities and may be recorded either in analog or digital form for processing and interpretation. Analog detection of the tuned field discontinuities may be performed by feeding the heterodyne product signal to a level comparator to convert micro field pulsations, i.e., tuned field discontinuities or transient occurrences, into, for example, 5 volt representative pulses. The pulses from the comparator are counted and converted to a voltage proportionate to the number of pulses over a desired time period to drive an analog measuring device, for example, a pin recorder or a rate meter. The desired time period may be from 0.01 seconds to 10 seconds. Preferably, a window detector using a counter IC is used to count the number of micro pulsations within a given period of time, i.e., a pulse density. This counter then generates a trigger voltage when the count exceeds a previously specified number within a given time period.

These and other features and advantages of the present invention will become apparent from the following detailed description, wherein reference is made to the accompanying drawings.

BRIEF DESCRIPTION OF THE DRAWINGS

FIGS. 6A through 6G is a detailed schematic of the embodiment shown in FIG. 5.

DETAILED DESCRIPTION OF THE INVENTION

Figure 1:
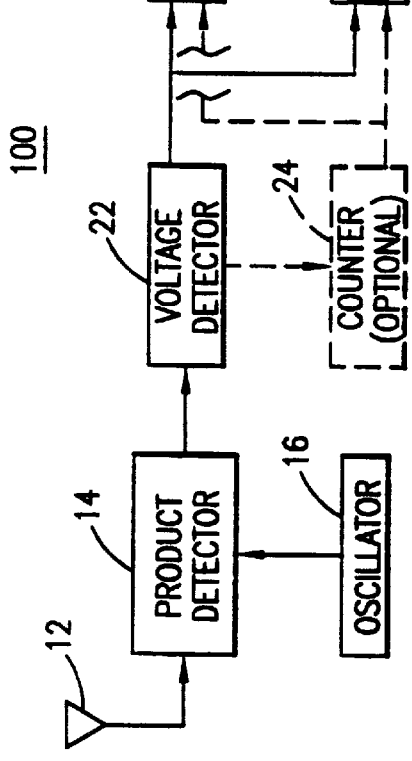
FIG. 1 is a simplified functional representation of an embodiment of the present invention.
Figure 2:
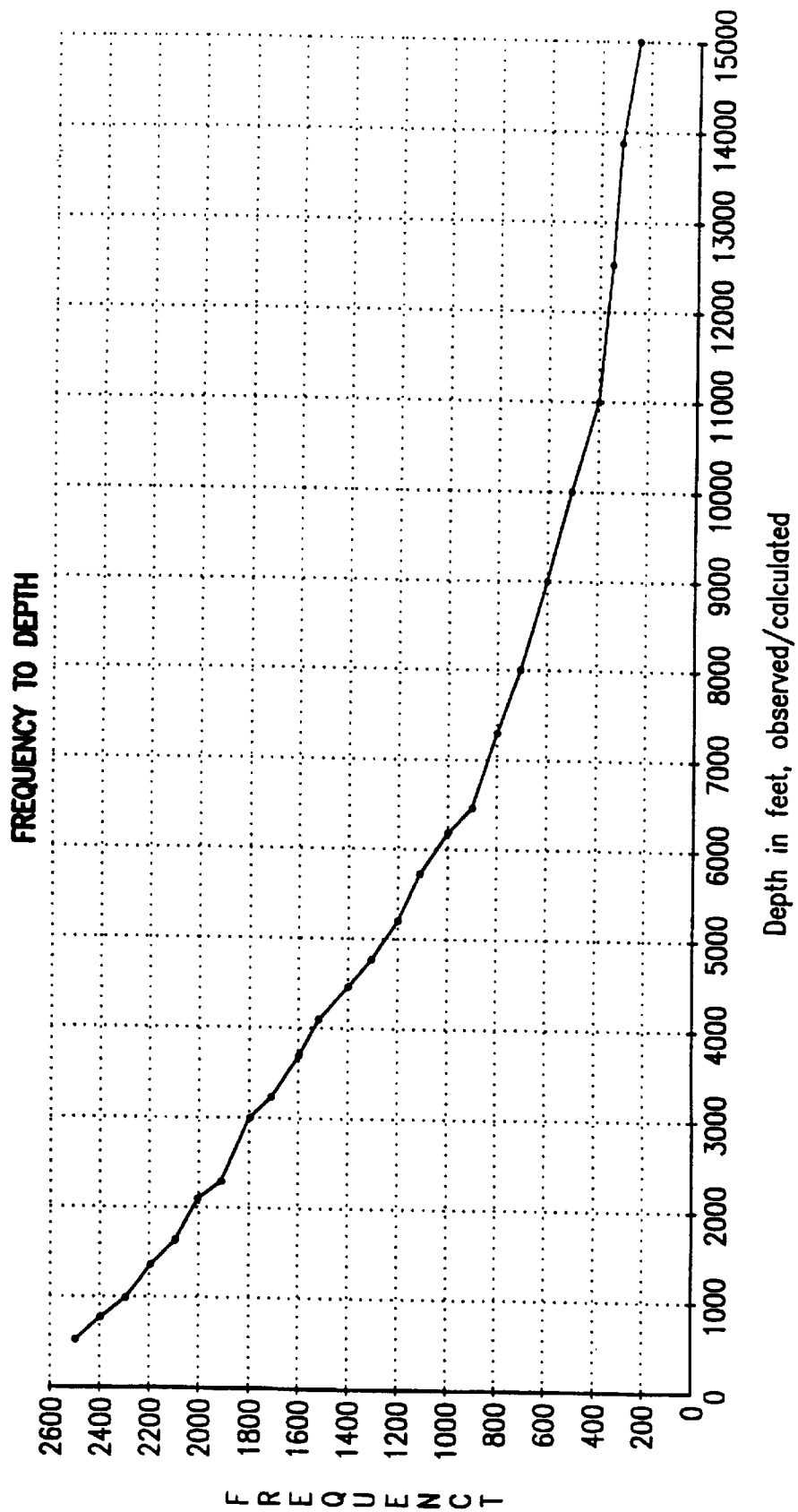
FIG. 2 is a graph depicting the relationship of depth to frequency contained in the signal emanating from the Earth's surface.

Referring now to FIG. 1, there may be seen a simplified functional representation of one embodiment of an apparatus 10 suitable for the purposes of the present invention. The apparatus 10 has an antenna 12 for receiving the low frequency signal emanating from the Earth's surface. The emanating signal has a frequency range in the electromagnetic frequency range of 0 to about 5,000 Hz. Each of the frequencies in this range is representative of subterranean information corresponding to a certain depth below the Earth's surface. See FIG. 2 for a frequency versus depth relationship with the dots representing actual data and the dashed lines connecting the dots representing an interpolation of the data. More particularly, the frequency to depth relationship is dependent on the Earth's resistivity and electrical properties for a particular area. The actual data points on FIG. 2 represent an average of observed depth for the respective frequency from several well known basins. As noted above, depths will vary from area to area for each particular frequency. Though the graph in FIG. 2 may be used for estimation purposes, it is preferred that the depth/frequency relationship be determined for the particular area of interest. This may be done by using the apparatus 10 to determine the locations of subterranean anomalies and comparing this data to information known about the area such as existing wells or seismic data, preferably, where the survey was performed using the apparatus 10. In this manner, a correlation of frequency and depth may be established the particular area of interest.

Referring again to FIG. 1, the antenna 12 generates a received signal representative of the emanating signal and contains information for all depths over the frequency range of the signal. The antenna 12 is electrically connected to a product detector 14 which receives as a first input the received signal. The product detector 14 may be a demodulator, e.g., LM1496 and LM1596 which are balanced modulator demodulators available from National Semiconductor, Santa Clara, Calif., which is configured as a demodulator. The apparatus 10 also includes an oscillator 16 which generates a tuning frequency. Preferably, the oscillator 16 is capable of generating tuning frequencies across the range of frequencies contained in the received signal. More preferably, the oscillator 16 is capable of sweeping through this range of frequencies, preferably in increments or decrements of from about 0.01 Hz to about 10 Hz. The sweeping rate is preferably from about 1 Hz per second to about 200 Hz per second. The oscillator 16 is electrically connected to the product detector 14 which receives the tuning frequency as a second input. The product detector 14 beats the tuning frequency against the received signal to generate a tuned signal for each tuning frequency as an output. Accordingly, each tuned signal represents a certain depth within the Earth and contains information regarding subterranean anomalies, which may be a hydrocarbon, e.g. oil and/or gas, or a mineral deposit, e.g., precious metals. The product detector 14 may be connected to a recording device such a chart pin recorder 18 or to a storage and processing device such as a computer 20. It is noted that this connection need not be a direct electrical connection, but may be through a transmitter (not shown) which is electrically connected to the apparatus 10 which transmits the signal to a base location which has a receiver (not shown) which in turn is electrically connected to the recorder 18 and/or computer 20. The computer 20 may store the raw data and manipulate the raw data in real-time or at a later date. As the oscillator 16 sweeps through the frequency range of the received signal, a curve is generated relative to frequency. The curve is of signal strength at a particular depth versus frequency which represents depth. Surprisingly, the curve is for the most part reproducible in a relative sense in that the relationship of relative strength of the signal when comparing the different frequencies appears to be reproducible. Further, the survey performed with apparatus 10 is a snap shot in time in the sense that a particular frequency is not maintained for a long period of time to see if there is an time variation of the signal strength at the particular location. This avoids any fluctuations in the overall strength of the received signal which may introduce unnecessary error into the survey.

Accordingly, the survey performed by the apparatus and obtained by the method of the present invention is distinguishable from that disclosed in U.S. Pat. No. 5,148,110 to Helms. Further, the survey of the present invention is conducted while stationary. Helms recognizes that there will be no change in the received signal, but is not interested in the signal content to determine the character of the subterranean formation. Helms uses his invention in a stationary setting only to detect a time rate of change which occurs when a transient anomaly occurs in the vicinity of his detector, for example, when seismic activity occurs or passage of a large conducting or nonconducting mass passes past the detector, e.g., a submarine. See column 7, line 63—column 8, line 15 thereof. This is what Helms refers to a time varying signal. Otherwise, Helms uses his invention while traversing the surface of the Earth to detect changes at specific frequencies as a function of distance traversed to locate subterranean anomalies. This is what Helms refers to as a (surface) location varying signal.

Figure 3:
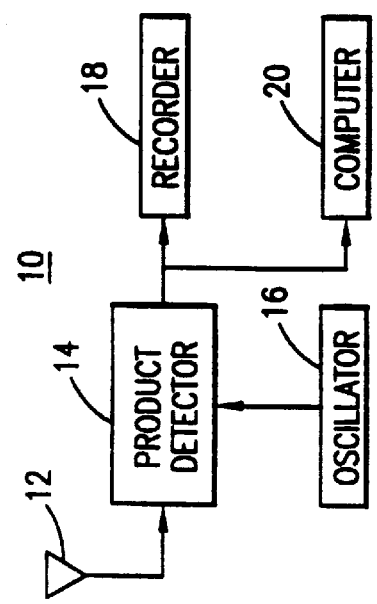
FIG. 3 is a simplified functional representation of another embodiment of the present invention.

Referring now to FIG. 3, there is shown a functional representation another embodiment of the present invention as apparatus 100. In order to enhance the reliability and reproducibility of the apparatus according to the present invention, the apparatus 100 has a voltage detector 22. The apparatus 100 is like apparatus 10, with the exception the apparatus 100 also has the voltage detector 22 and optionally also has a counter 24 (shown in dashed lines). The voltage detector 22 receives the tuned signal from the product detector 14, detects the tuned information carried by the tuned signal and converts the tuned information to pulses. The pulses are outputted by the voltage detector 22. The pulses or output signal may be recorded digitally on tape or in analog fashion on a strip recorder 18 and/or sent to a computer 20 for display on a CRT (not shown) and later manipulated. It is noted that the function of the voltage level detector 22 may be performed by the computer 20 in apparatus 10 (FIG. 1) by acting on the tuned signal received by it in real-time or after the fact by manipulating stored tuned signal information and generating data equivalent in information content to the pulses generated by the voltage level detector 22.

Preferably, the pulses are counted over a desired time period to determine the pulse density, i.e., number of pulses per unit of time. Whether the computer 20 in apparatus 10 or the voltage level detector 22 in apparatus 100 generates the pulse data, the pulse density may be determined from the pulse data using the computer 20. Further, the pulse data may be manipulated using the computer 20, e.g., by varying the specified unit of time, i.e., the time span, to examine the pulse density information. Alternatively, as shown in FIG. 3 with the voltage level detector 22 in place, the apparatus 100 may further comprise a counter 24 (shown in dashed lines) which may be set to trigger an output signal when a specific number of pulses per unit time is achieved. The trigger point may be varied, thereby varying the specified unit of time, i.e., the time span, to examine the pulse density information. The output of the voltage level detector 22 would be received by the counter 24 rather than by the recorder 18 and the computer 20. Alternatively, if desired, the recorder 18 and computer 20 could receive the outputs from both the voltage level detector 22 and the counter 24.

Figure 4:
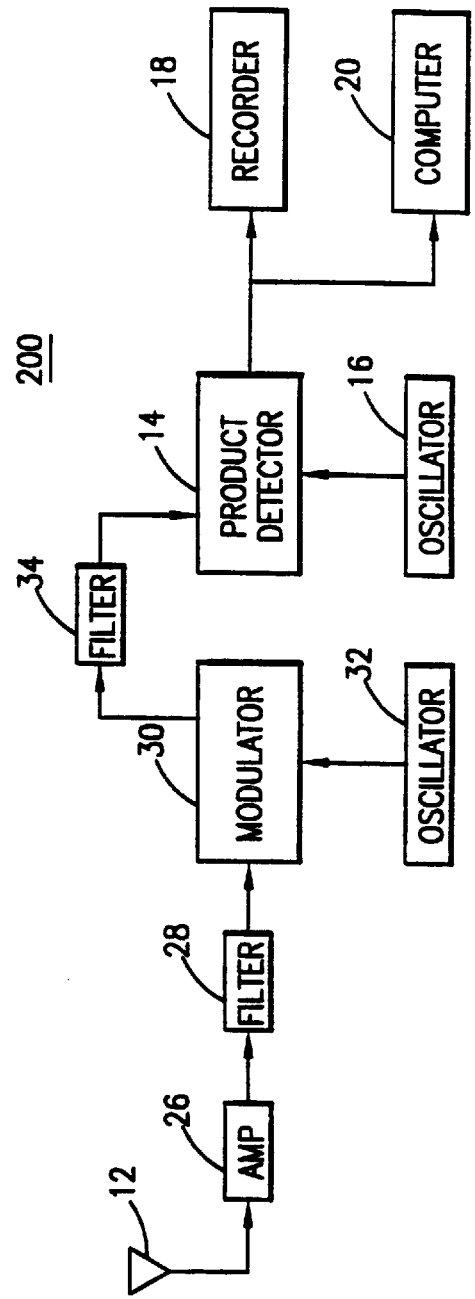
FIG. 4 is a simplified functional representation of another embodiment of the present invention.

Referring now to FIG. 4, there is shown a simplified functional representation of another embodiment of the present invention. In view of the low frequencies and low signal strength of the signals emanating from the Earth's surface, the received signal is preferably conditioned to increase its frequency and signal strength to enhance detection of the tuned signal information. Thus, in FIG. 4, there is shown apparatus 200 having an antenna 12 for receiving the signal emanating from the Earth's surface and generating a received signal. The antenna 12 is electrically connected to an amplifier 26 which in turn is electrically connected to a filter 28. The amplifier 26 may be, for example, a TL072 dual operational amplifier available from Texas Instruments. Accordingly, the received signal is amplified and filtered resulting in an amplified, filtered signal. The filter 28 is electrically connected to a modulator 30. The modulator 30 is preferably a sideband modulator, e.g., LM1496 and LM1596 which are balanced modulator demodulators available from National Semiconductor, Santa Clara, Calif. The modulator 30 is also electrically connected to an oscillator 32 which generates a carrier wave. The oscillator 32 may be any sine wave oscillator. The signal is then modulated onto the carrier wave generating a modulated signal. The modulated signal is then filtered by filter 34 to eliminate one of the sidebands, for example, the lower sideband which is the mirror image of the upper sideband and therefore contains redundant information relative to the upper sideband. The modulator 30 may also be configured and used as a single sideband suppressed carrier demodulator in which the resulting signal only has one of the sidebands. The resulting signal may be used in other prior art passive geophysical prospecting devices such as those identified in the background section hereof since the resulting signal has been strengthened power-wise and filtered and accordingly has a better signal to noise ratio than signals which had been conditioned by prior art methods.

However, as shown in FIG. 4, the apparatus 200 preferably has a product detector 14, an oscillator 16, and a recorder 18 and computer 20. In this case, the oscillator 16 generates a tuning frequency which is then beat against the filtered, modulated signal by the product detector 14 in order to tune to a particular frequency. The oscillator 16 sweeps through the range of frequencies in the upper sideband portion of the filtered, modulated signal. For each desired frequency in this range, a tuned signal is generated corresponding to the desired frequency and therefore a certain depth in the Earth. The output of the product detector 14 is then sent to the recorder 18 and/or the computer 20. Alternatively (not shown), the output of the product detector 14 may be sent to a voltage detector 22 and then to the recorder 18 and/or the computer 20 as shown in FIG. 3. As a further alternative, the output of the voltage level detector 22 may be sent to a counter 24 and then to the recorder 18 and/or the computer 20 again as shown in FIG. 3 (using the dashed line configuration).

As discussed in regards to FIG. 3, if the apparatus 200 has a voltage detector 22, the voltage detector 22 receives the tuned signal from the product detector 14, detects the tuned information carried by the tuned signal and converts the tuned information to pulses. The pulses are outputted by the voltage detector 22. The pulses or output signal may be recorded digitally on tape or in analog fashion on a strip recorder 18 and/or sent to a computer 20 for display on a CRT (not shown) and later manipulated. The pulses are counted over a desired time period to determine the pulse density, i.e., number of pulses per unit of time. As noted above, the function of the voltage level detector 22 may be preformed by a computer 20 using methods and techniques known to those skilled in the art by acting on the tuned signal received by it in real-time or after the fact by manipulating stored tuned signal information and generating data equivalent in information content to the pulses generated by the voltage level detector 22. In either manner, the pulse density may be determined from the pulse data using the computer 20. Further, the pulse data may be manipulated using the computer 20, e.g., by varying the specified unit of time, i.e., the time span, to examine the pulse density information. Alternatively, with the voltage level detector 22 in place similar to FIG. 3, the apparatus 200 may further comprise a counter 24 which may be set to trigger an output signal when a specific number of pulses per unit time is achieved. The trigger point may be varied, thereby varying the specified unit of time, i.e., the time span, to examine the pulse density information.

Figure 5:
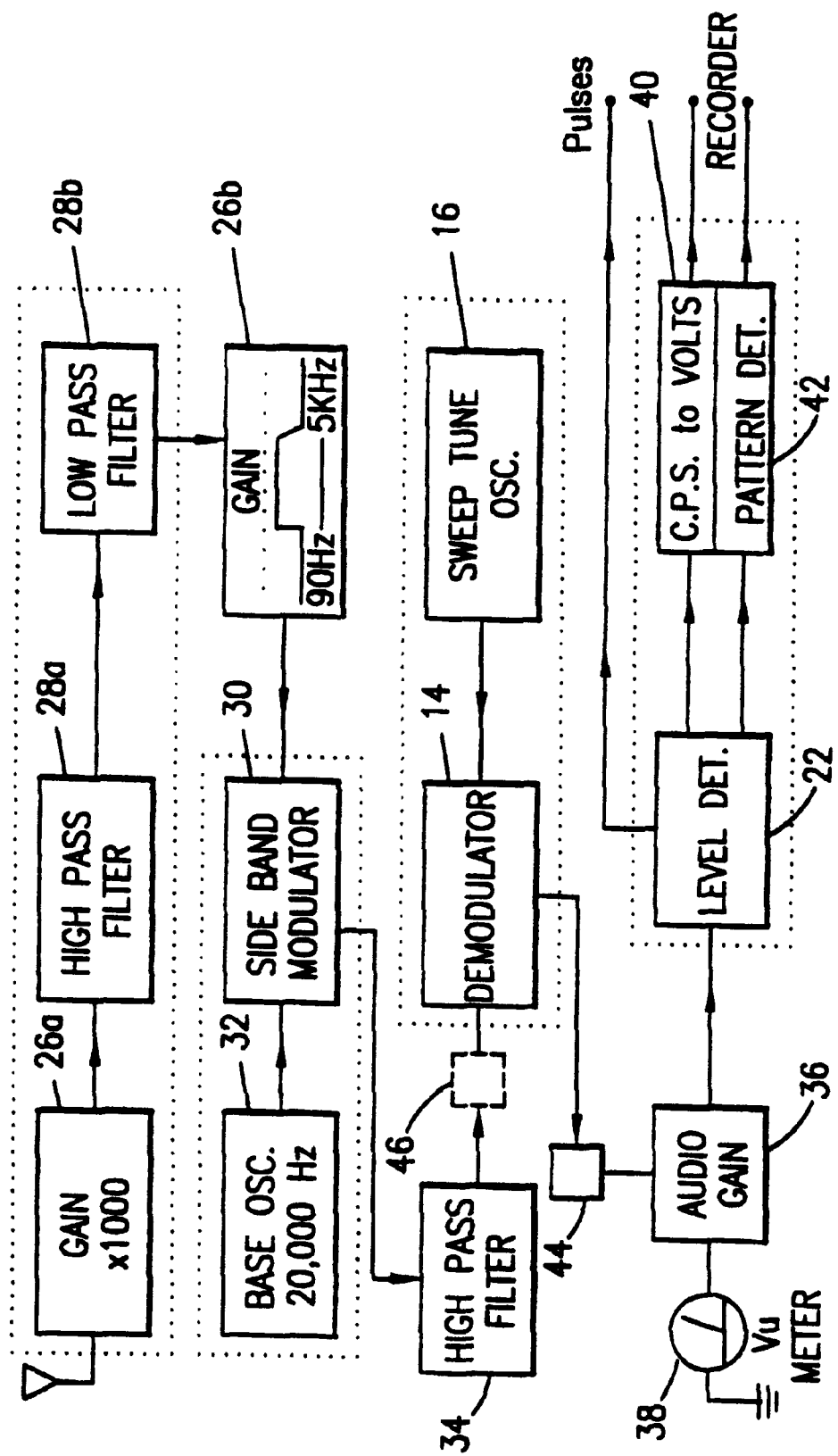
FIG. 5 is a simplified functional representation of another embodiment of the present invention.

Now referring to FIG. 5, there is shown a functional representation of another embodiment of the present invention. An apparatus 300 is depicted having an antenna 12, a first amplifier 26a, a first high pass filter 28a, a low pass filter 28b, a second amplifier 26b, a modulator 30, an oscillator 32, a second high pass filter 34, a demodulator configured as a synchronous product detector 14, an oscillator 16, a low pass filter 44, a third amplifier 36, a meter 38, a voltage level detector 22, a rate meter 40 and a pattern detector 42.

The antenna 12 in one embodiment is metal core made of a metal which has a high susceptibility to magnetic fields but low in retention time. The metal may be e.g., Permalloy. The metal core is then wound with, e.g., copper magnet wire. The assembly is then placed within a protective sheath, e.g., a PVC tube. In a particular embodiment, the Peimalloy core was about 3/8 inch in diameter about 4 to 6 inches long, a single layer of 16 gauge copper magnet wire was wound around the circumference of the metal core over about 2/3 of the length of the core. By having this type of antenna relatively short in core length, the creation of inductance is minimized therefore preserving the received signal. In use, the antenna may be laid on the surface of the ground with the main axis of the antenna substantially parallel thereto, or more specifically, substantially perpendicular to an imaginary ray extending from the center of the Earth to the surface of the Earth.

In a specific embodiment, the received signal was then amplified by amplifier 26a using a TL072 dual operational amplifier. The high pass filter 28a was an active high pass filter consisting of a 9-pole, −120 db drop at 60 Hz using a TL072 dual operational amplifier. The low pass filter 28b consisted of a 2 pole −60 db drop at 8,000 Hz using a TL072 dual operational amplifier. The combination of the high pass filter 28a and low pass filter 28b resulted in a pass band of frequencies from about 90 Hz to about 8,000 Hz. The band passed signal is the amplified using amplifier 26b and sent to the modulating input of the sideband modulator 30 which was an LM1496 balanced modulator demodulator. The carrier wave was supplied using a sine wave oscillator 32 set at 20,000 Hz. The modulated signal is high pass filtered using a 2 pole −40 db drop at 20,000 Hz active filter 34 comprising an LM356 operational amplifier. The resulting output has a frequency bandwidth of from about 20,000 Hz to about 28,000 Hz, which was the upper sideband of the modulated signal. This signal is then sent to the signal input of a National Semiconductor LM1496 balanced modulator demodulator configured as a synchronous product detector 14 outputting the product of the inputted signal and the output signal of the tuning oscillator 16. The tuning sweep oscillator 16 generated a sine wave of from 20,000 Hz to 25,000 Hz. The sweep oscillator 16 also had the ability to continuously sweep through the bandwidth of from 20,000 Hz to 25,000 Hz at various set continuous sweep rates of from 1 Hz per second to 50 Hz per second. The detected signal resulting from the product detector 14 was then sent to a passive low pass filter 44 set at 10,000 Hz, and was then amplified using a National Semiconductor LM380 audio amplifier 36. The output of the audio amplifier 36 contained the demodulated, valuable information for the frequency tuned. This output signal was then sent to the voltage level detector 22 comprising a National Semiconductor LM311 voltage comparator. This detector 22 compared the signal input thereto against a selectable DC voltage to detect scalar voltage potentials existing in the tuned demodulated signal. The reference DC voltage level may be adjusted using a potentiometer to a desired level to increase or reduce the sensitivity of the detector 22. For example, the reference DC voltage level could be set to a value such as 4.95 volts so that slight variations above this level will be recognized in the signal range of interest. The comparator, i.e., detector, 22 was configured to output pulses of from 0 to 5 volts representing the detected scalar voltages that represent the important information about subterranean geologic formations and their contents, i.e., hydrocarbons or precious metals. The output of the comparator 22 was sent to a rate meter 40 to be converted from pulses per second to a corresponding voltage. The voltage output of the rate meter 40 was used to establish a base line reference for recording purposes. The output of the comparator 22 was also sent to a pattern detector 42 which counted the number of pulses in a given period of time and outputs a response to a recorder 18 (not shown in FIG. 5) when a preselected number of pulses for a given time period was encountered or exceeded. The preselected number of pulses in a given time period is preferably adjustable. This variable may be adjusted based on the activity encountered in the signal of interest. This difference in activity may be due to the difference in material being prospected, e.g., oil versus gold, and/or the quantity of such material encountered in the subterranean formation. An output from the comparator 22 was also available to a computer 20 (not shown on FIG. 5) where the pulses are digitized and processed using methods and techniques known by those skilled in the art to determine the pulse density over a selected period or unit of time. The processed information may then be printed using a printer (not shown).

Figure 6A:
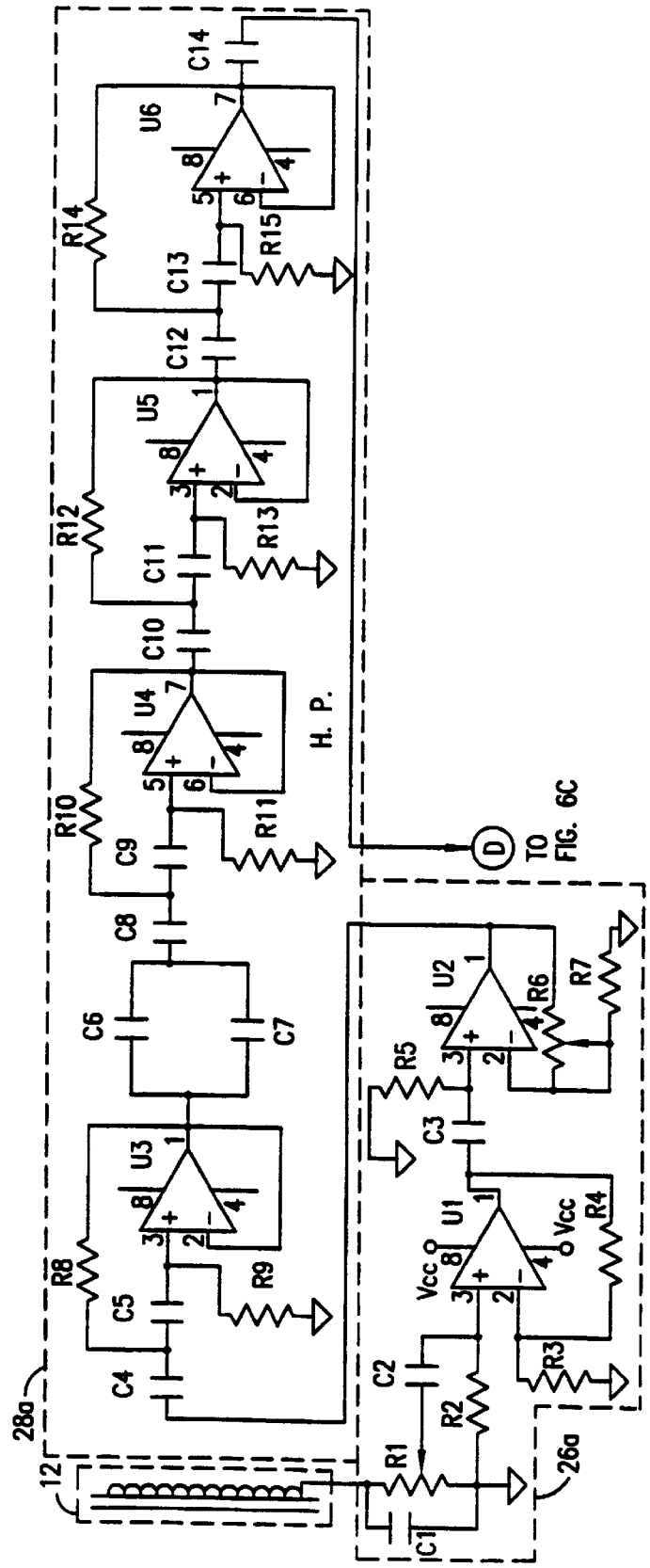
Figure 6B:
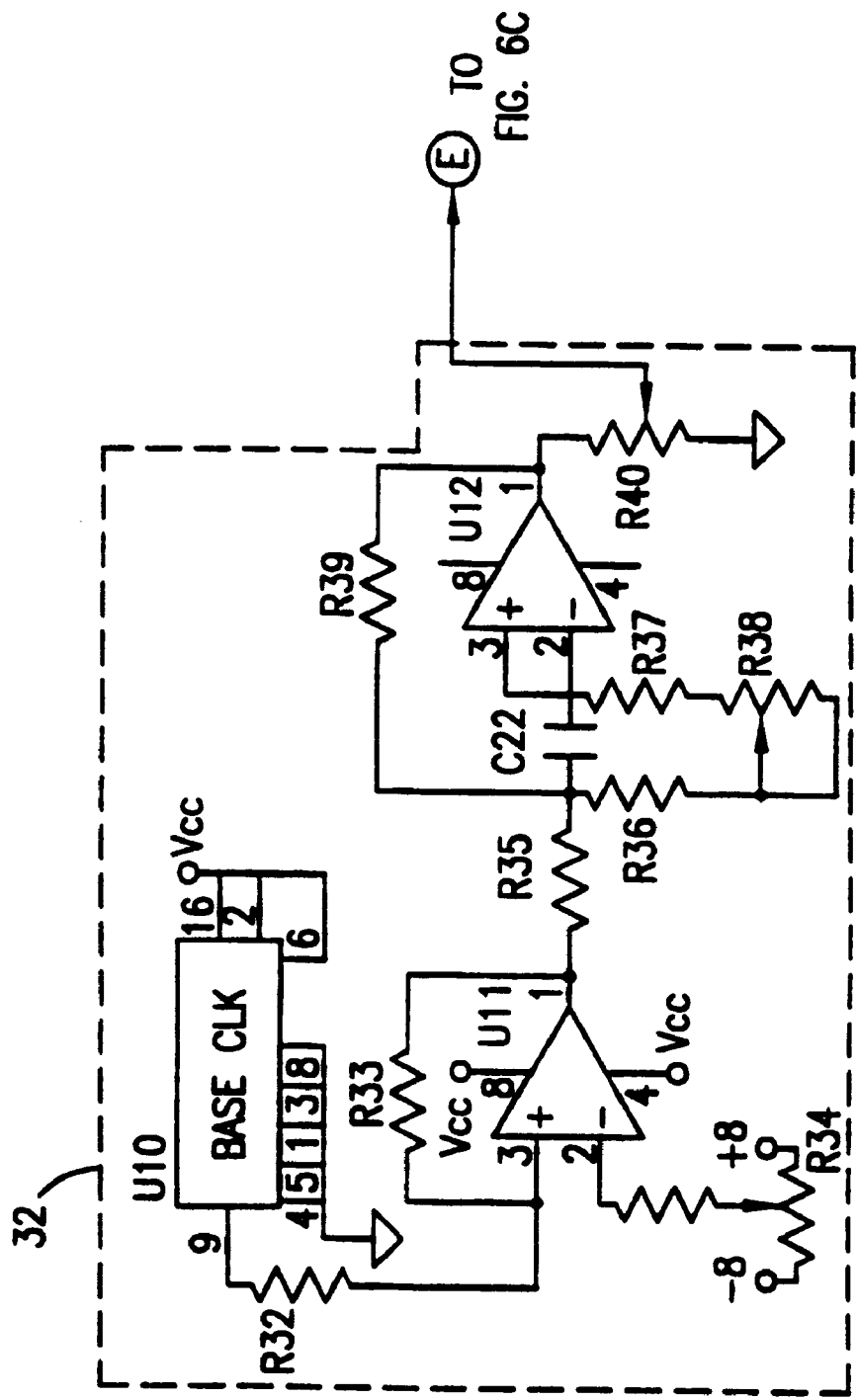
Figure 6D:
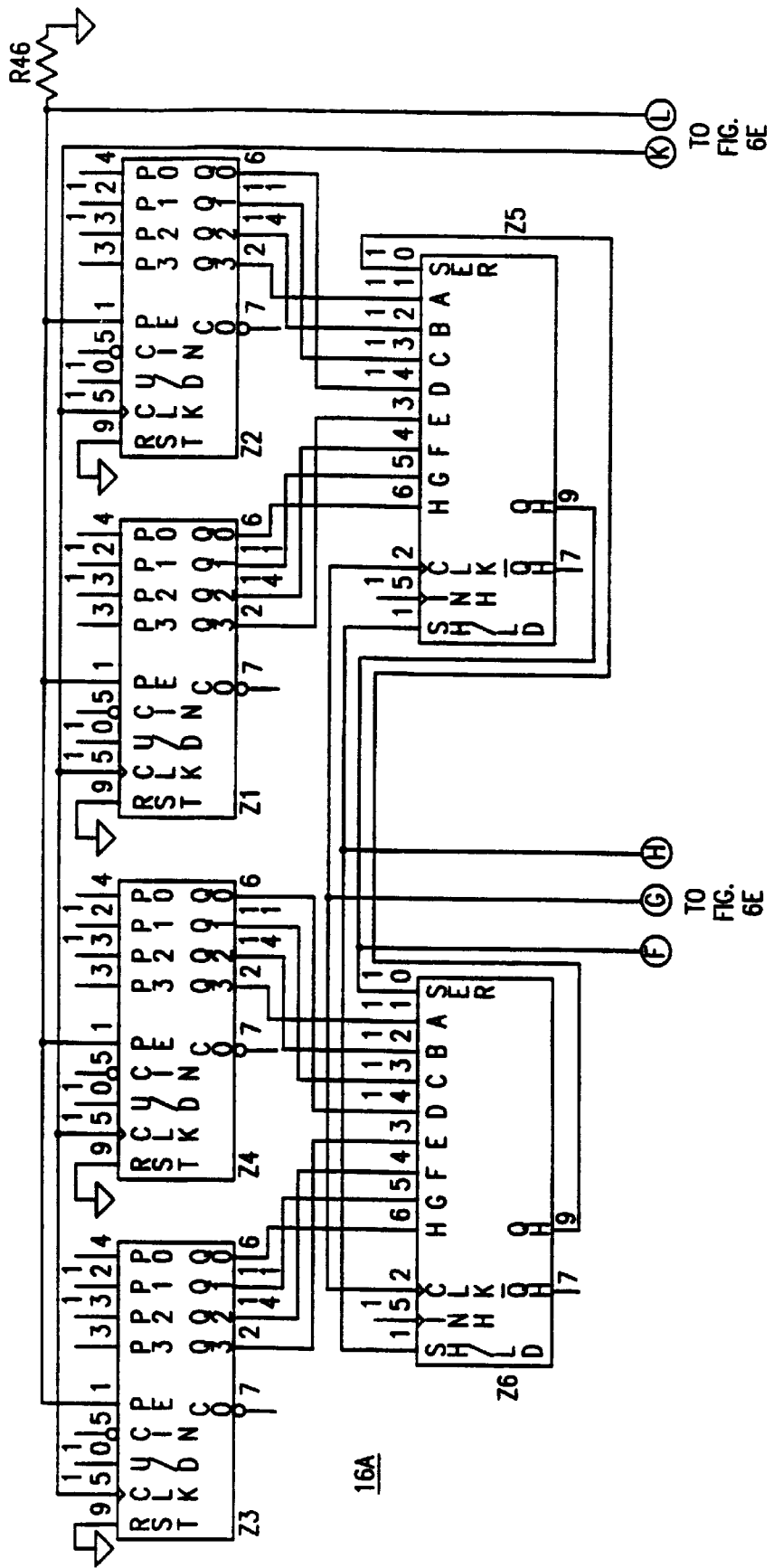
Figure 6E:
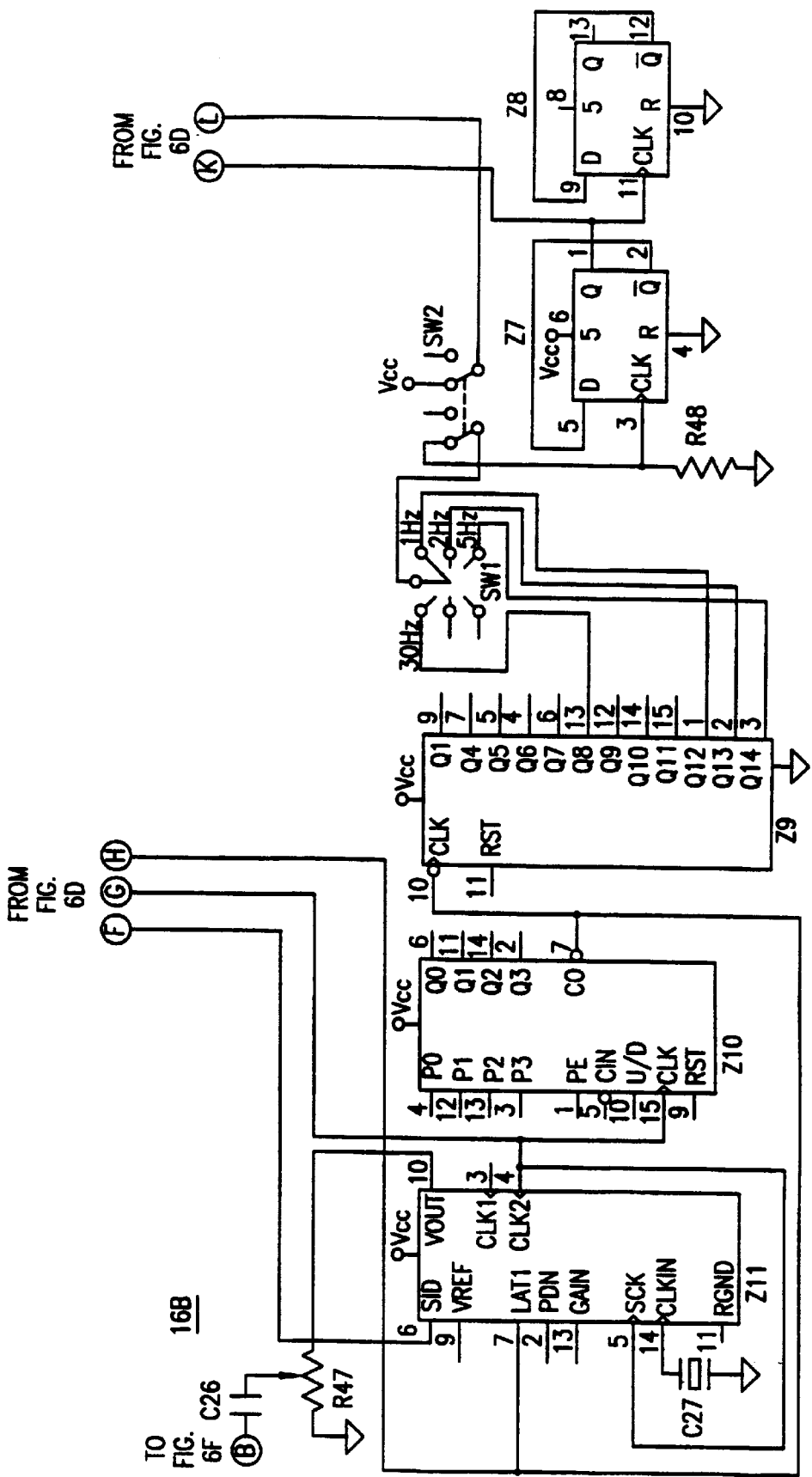
Figure 6F:
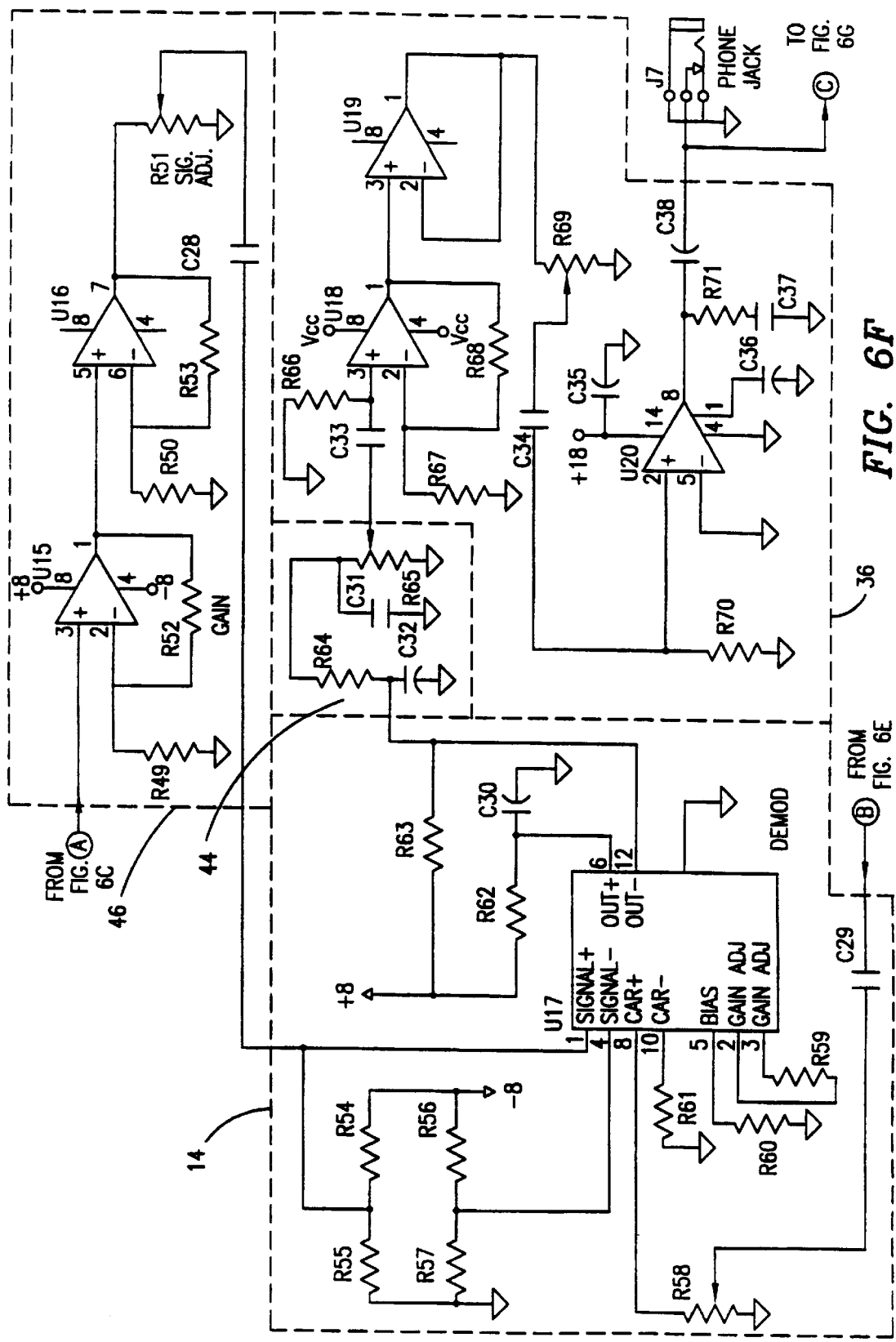
Figure 6G:
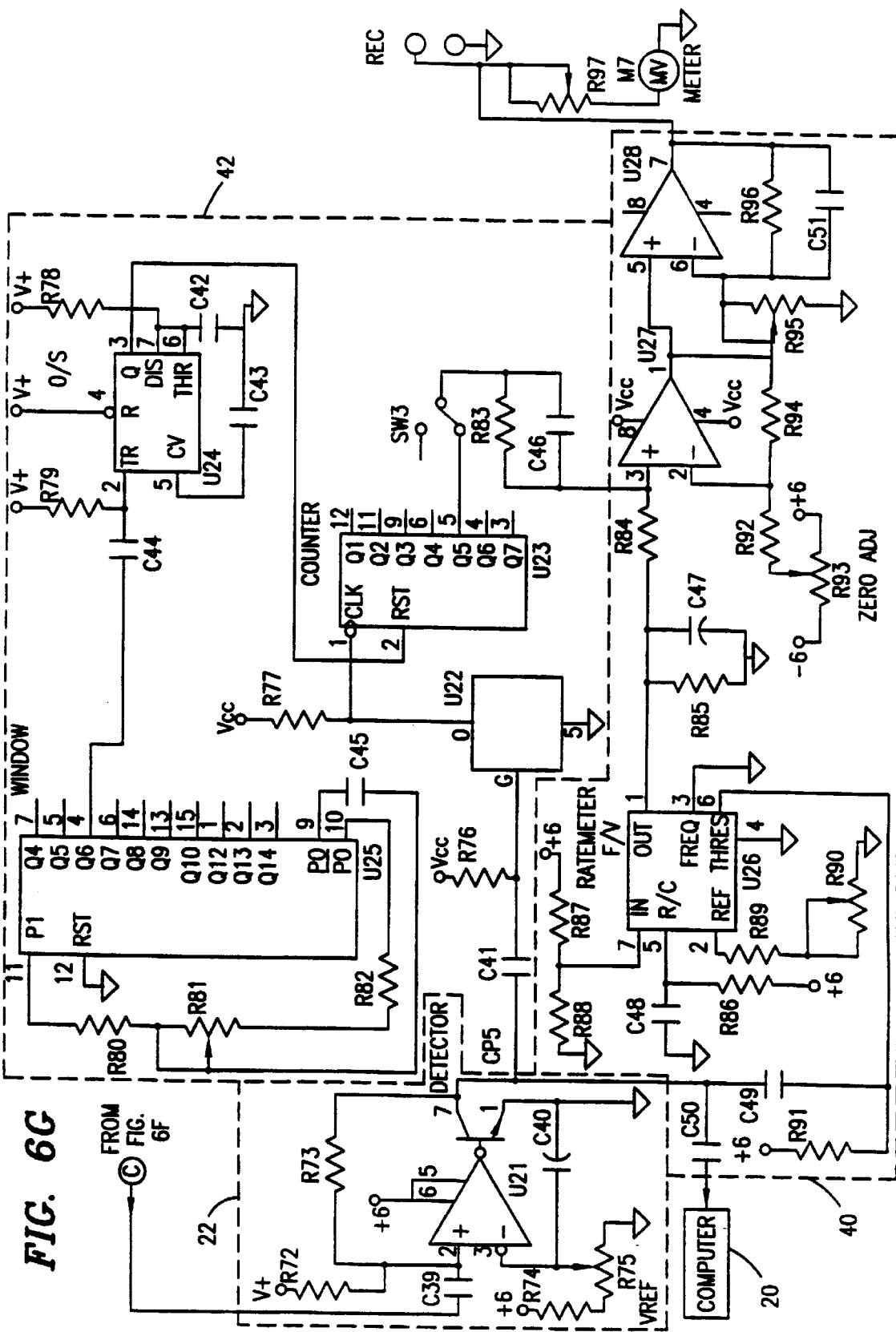

FIGS. 6A–6G with minor differences (detailed in parentheticals where appropriate) are a detailed schematic of the embodiment shown in FIG. 5. FIGS. 6A–6C depict the antenna 12 and the circuitry for amplifier 26a, high pass filter 28a, low pass filter 28b, amplifier 26b, modulator 30, oscillator 32 and high pass filter 34 (an LM356 operational amplifier is referenced in the discussion of FIG. 5 and a pair of TL072 operational amplifiers are identified in FIG. 6C). FIGS. 6D and 6E depict the circuitry for oscillator 16 (referenced in FIGS. 6D and 6E as 16A and 16B). FIG. 6F depicts the circuitry for amplifier 46 (not specifically discussed in regard to FIG. 5, but shown in dashed lines on FIG. 5 since present in FIG. 6F), product detector 14, filter 44 and amplifier 36 (discussion of FIG. 5 indicates a LM380 and FIG. 6F identifies LM 384). FIG. 6G depicts the circuitry for the voltage level detector 22, rate meter 40 and pattern detector 42.

The following is a list of the components in FIGS. 6A through 6G. In regards to adjustable resistors or potentiometers, "(adj.)" is indicated next to the maximum resistance. "TL072" and "TL082" refer to operational amplifiers available from Texas Instruments. "LM1496", "LM384", "LM555" and "LM381" refer to products available from National Semiconductor. "ML2036" is a programmable sinewave generator available from Micro Linear. "SPG 8540 AN" is a crystal oscillator available from Analog Devices. "2n 7000" is a transistor wherein "G" stands for gate, "D" stands for drain and "S" stands for source. "4516", "165", "4013", "4020", "4024" and "4060" are generic chips known to those skilled in the art. "OP 290" is an operational amplifier.

| Crystal: |
| --- |
| C27-4.194 mega Hz crystal |

Capacitors:

| | | |
|---|---|---|
| C1-100 pF | C18-25 µF | C36-5 µF |
| C2-1 µF | C19-25 µF | C37-0.1 µF |
| C3-0.1 µF | C20-0.1 F | C38-220 µF |
| C4-0.1 µF | C21-0.1 F | C39-1 µF |
| C5-0.1 µF | C22-.002 F | C40-33 µF |
| C6-0.068 µF | C23-0.1 µF | C41-1 µF |
| C7-0.068 µF | C24-0.001 F | C42-0.01 F |
| C8-0.068 µF | C25-0.001 F | C43-0.01 F |
| C9-0.068 µF | C26-1 µF | C44-0.1 F |
| C10-0.1 µF | C28-0.1 F | C45-0.01 F |
| C11-0.1 µF | C29-0.1 µF | C46-0.001 F |
| C12-0.068 µF | C30-0.01 F | C47-4.7 µF |
| C13-0.068 µF | C31-0.01 F | C48-0.01 µF |
| C14-0.01 µF | C32-0.01 F | C49-470 pF |
| C15-.001 F | C33-1 µF | C50-.1 F |
| C16-.001 F | C34-0.1 µF | C51-1 µF |
| C17-0.1 µF | C35-5 µF | |

Resistors:

| | | |
|---|---|---|
| R1-500 ohm (adj.) | R7-1K ohm | R13-14K ohm |
| R2-1 meg ohm | R8-10.2K ohm | R14-3.32K ohm |
| R3-100 ohm | R9-17.4K ohm | R15-113K ohm |
| R4-1K ohm | R10-7.5K ohm | R16-2.72K ohm |
| R5-100 ohm | R11-61.9K ohm | R17-14K ohm |
| R6-50K ohm (adj) | R12-17.4K ohm | R18-1K ohm |
| | R46-10K ohm | R73-2 meg ohm |
| R19-10K ohm | R47-10K ohm (adj.) | R74-1K ohm |
| R20-10K ohm (adj.) | R48-10K ohm | R75-5K ohm (adj.) |
| R21-10K ohm | R49-1K ohm | R76-10K ohm |
| R22-50K ohm (adj.) | R50-1K ohm | R77-10K ohm |
| R23-10K ohm | R51-10K ohm (adj.) | R78-100K ohm |
| R24-100 ohm | R52-50K ohm | R79-100K ohm |
| R25-100 ohm | R53-50K ohm | R80-100K ohm |
| R26-100 ohm | R54-1K ohm | R81-100K ohm (adj.) |
| R27-13K ohm | R55-1K ohm | R82-20K ohm |
| R28-10K ohm | R56-1K ohm | R83-100K ohm |
| R29-1K ohm | R57-1K ohm | R84-1K ohm |
| R30-1K ohm | R58-5K ohm (adj.) | R85-100K ohm |
| R31-820 ohm | R59-1K ohm | R86-6.8K ohm |
| R32-1K ohm | R60-6.8K ohm | R87-10K ohm |
| R33-1K ohm | R61-50K ohm | R88-68K ohm |
| R34-10K ohm (adj.) | R62-3.9K ohm | R89-10K ohm |
| R35-380K ohm | R63-3.9K ohm | R90-10K ohm (adj.) |
| R36-1K ohm | R64-1K ohm | R91-10K ohm |
| R37-1K ohm | R65-10K ohm (adj.) | R92-1K ohm |
| R38-10K ohm (adj.) | R66-1K ohm | R93-10K ohm (adj.) |
| R39-380K ohm | R67-1K ohm | R94-1K ohm |
| R40-5K ohm (adj.) | R68-20K ohm | R95-1K ohm (adj.) |
| R41-3K ohm | R69-5K ohm (adj.) | R96-10K ohm |
| R42-1 meg. ohm | R70-1 meg ohm | R97-5K ohm (adj.) |
| R43-20.43K ohm | R71-2.7 ohm | |
| R44-3.26K ohm | R72-50K ohm | |
| R45-3K ohm | | |

Chips and Operational Application:

| | | |
|---|---|---|
| U1-TL072 | U14-TL072 | U28-OP290 |
| U2-TL072 | U15-TL072 | Z1-4516 |
| U3-TL082 | U16-TL072 | Z2-4516 |
| U4-TL082 | U17-LM1496 | Z3-4516 |
| U5-TL082 | (set pin 1 to 400 mV | Z4-4516 |
| U6-TL082 | and pin 8 to 300 mV) | Z5-165 |
| U7-TL072 | U18-TL072 | Z6-165 |
| U8-TL072 | U19-TL072 | Z7-4013 |
| U9-LM1496 | U20-LM384 | Z8-4013 |
| (set pin 1 to 325 mV | U21-LM311 | Z9-4020 |
| and pin 8 to 10 mV) | U22-2n7000 | Z10-4516 |
| U10-SPG 8540AN | U23-4024 | Z11-ML2036 |
| (BASE CLOCK) | U24-LM555 | |
| U11-TL072 | U25-4060 | |
| U12-TL072 | U26-LM331 | |
| U13-TL072 | U27-OP290 | |

|   |   |
|---|---|
| -continued | |
| Crystal: | |
| C27-4.194 mega Hz crystal | |
| Switches: | |
| SW1 | |
| SW2 | |
| SW3 | |

In each of Z1, Z2, Z3 and Z4, pins 10 and 16 are connected to Vcc and pins 8 and 9 are connected to ground. In each of Z5 and Z6, pin 16 is connected to Vcc and pin 8 is connected to ground. In Z8, pins 6, 7 and 8 are connected to ground. In Z9, pins 8 and 11 are connected to ground. In Z10, pins 1, 3, 4, 5, 8, 9, 12 and 13 are connected to ground. In Z11, pins 11 and 12 are connected to ground.

EXAMPLES

Example 1

In this example, an apparatus according to that depicted in FIGS. 6A–6G was tested to determine the accuracy of the apparatus relative to known subsurface hydrocarbons. The Channing Gas Field over the Morrow Formations in eastern Colorado was selected as the site for the test. As the apparatus swept through the frequencies of passive electromagneticfields emanating from the Earth, tuned field activity react to discontinuities caused by subsurface hydrocarbons and were expressed as a spike or series of spikes on the recorder opposite a given frequency. The frequency was related to depth using FIG. 2. The producing formation in this field is located at about 4600 feet below the Earth's surface. The equipment easily fitted into a small carrying case which readily fit in the rear of a sports utility vehicle.

At total of fourteen (14) readings at different locations were taken, but two were invalid because they were taken outside the preferred time window of the morning to early afternoon or because of atmospheric disturbances such as thunderstorms. Eight (8) of the remaining readings were over the oil bearing formation and four (4) outside the boundaries of the formation. Of the eight (8), six (6) readings gave positive indications of the presence of hydrocarbons at the depth of interest. This represents a 75% success rating for detecting hydrocarbon bearing formations.

One (1) of the negative readings over the field was next to the Springer 1–33 well. It is believed that this negative reading resulted due to the thin formation which is about 500 feet thick in this area and the effect of a nearby producing well had depleted the formation at this point. It should be noted that partially depleted fields in Texas such as the Delhi field and the Katy field did give good responses when surveyed by this apparatus, but these fields produce from a thicker hydrocarbon interval. Similar false readings may occur in formation zones which have been water flooded, particularly if the zones are relatively thin.

One (1) of the positive points was repeated at a later time. These two readings were very similar and demonstrated the good repeatability achieved by the apparatus.

Of particular interest were the four (4) readings taken outside the formation boundaries. All of these readings gave negative indications for the presence of hydrocarbons. Accordingly, the apparatus achieved a 100% success rating in determining the absence of hydrocarbons in subterranean formations. Three other fields in the Morrow Formation were tested outside the boundary of hydrocarbon bearing areas therein and achieved a success rating of about 93%. These results makes the apparatus quite valuable as a prospecting tool in wildcat areas, at least to rule out areas where multiple readings are taken and a substantial portion thereof provide negative indications for the presence of hydrocarbons.

Example 2

In this example, the apparatus used in Example 1 was used to prospect for gold bearing formations. An area of interest was surveyed. Based of subsurface samples, the apparatus with multiple readings methodically located about the area being prospected successfully located a large gold bearing deposit and provided the thickness and boundaries of the vein and angle of inclination thereof.

What is claimed is:

1. An apparatus for passive geophysical prospecting based upon detection of detection of discontinuities associated with low frequency electromagnetic fields, the apparatus comprising:
    an antenna to pick up an extremely low frequency signal emanating from the Earth's surface, wherein the signal contains a range of frequencies and wherein each of the frequencies contained in the signal corresponds to a certain depth in the Earth;
    an oscillator which generates a tuning frequency, wherein the oscillator is capable of generating and sweeping though the frequencies contained in the signal; and
    a product detector which receives the signal picked up by the antenna and multiplies it with the tuning frequency generated by the oscillator generating a tuned signal, the tuned signal containing information regarding subterranean geologic formations at a certain depth corresponding to the tuning frequency.

2. The apparatus of claim 1, further comprising:
    means for digitizing the tuned information contained in the tuned signal.

3. The apparatus of claim 2, wherein the digitizing means comprises a voltage detector, wherein the voltage detector receives the tuned signal from the product detector, detects the tuned information carried by the tuned signal and converts the tuned information to pulses.

4. The apparatus of claim 3, wherein the digitizing means further comprises a counter to count the pulses received from the voltage detector and generate an output signal corresponding to the number of pulses counted over a specified unit of time.

5. The apparatus of claim 2, wherein the digitizing means comprises a computer programmed to detect the tuned information carried by the tuned signal and converting the tuned information to pulses.

6. The apparatus of claim 1, further comprising means for conditioning the received signal.

* * * * *